US011395124B2

(12) United States Patent
Rohde et al.

(10) Patent No.: US 11,395,124 B2
(45) Date of Patent: Jul. 19, 2022

(54) ARTIFICIAL INTELLIGENCE FOR EMERGENCY ASSISTANCE (71) Applicant: Kant AI Solutions LLC, Washington, DC (US)

(72) Inventors: Gregory L Rohde, Washington, DC (US); Michael M Kangior, Washington, DC (US); Tyler S Tappan, Haymarket, VA (US)

(73) Assignee: KANT AI SOLUTIONS LLC, Washington, DC (US)

( * ) Notice: Subject to any disclaimer, the term of this patent is extended or adjusted under 35 U.S.C. 154(b) by 0 days.

(21) Appl. No.: 17/313,608

(22) Filed: May 6, 2021

(65) Prior Publication Data
US 2021/0352460 A1    Nov. 11, 2021

Related U.S. Application Data (60) Provisional application No. 63/020,657, filed on May 6, 2020.

(51) Int. Cl.
*H04W 4/90* (2018.01)
*G06F 40/30* (2020.01)
*H04W 76/50* (2018.01)
*H04W 4/021* (2018.01)
*H04M 3/51* (2006.01)
*G06F 40/42* (2020.01)

(52) U.S. Cl.
CPC .............. *H04W 4/90* (2018.02); *G06F 40/30* (2020.01); *G06F 40/42* (2020.01); *H04M 3/5116* (2013.01); *H04W 4/021* (2013.01); *H04W 76/50* (2018.02)

(58) Field of Classification Search
CPC ...... H04W 4/90; H04W 76/50; G08B 25/106; H04M 11/04; H04M 2242/04
USPC ........................................................ 455/404.1
See application file for complete search history.

(56) References Cited

U.S. PATENT DOCUMENTS

| 10,033,705 | B2 * | 7/2018 | Heer | H04L 63/0428 |
| 2006/0235833 | A1 * | 10/2006 | Smith | H04W 76/50 |
| 2014/0370836 | A1 * | 12/2014 | Gladstone | H04W 4/02 |
| | | | | 455/404.1 |
| 2017/0011177 | A1 * | 1/2017 | Corpier | A61B 5/0022 |

(Continued)

*Primary Examiner* — Maria El-Zoobi
(74) *Attorney, Agent, or Firm* — Michael P. Fortkort, Esq.; Protorae Law PLLC (57) ABSTRACT

A method and apparatus for providing emergency assistance includes receiving audio, visual, or text data about an ongoing emergency at a public safety answering point, comparing that data to a database of other emergencies with an artificial intelligence engine, recognizing patterns in aggregated and correlated data by the artificial intelligence engine, and generating appropriate audio, visual, and text output for a human operator to respond to the emergency. An AI engine receives audio data, visual data, and text data related to ongoing emergencies being received at public safety answering points and compares it with data from other emergencies. The AI engine identifies key words and patterns and generates appropriate messages for operators. The system continuously generates feedback to the AI engine to aid in machine learning. The feedback includes: "the message was correct; continue drawing this conclusion"; and "the message was wrong; do not continue drawing this conclusion."

27 Claims, 7 Drawing Sheets (56) References Cited

U.S. PATENT DOCUMENTS

| | | | | |
|---|---|---|---|---|
| 2019/0386917 A1* | 12/2019 | Malin | ................... | H04L 67/561 |
| 2020/0274962 A1* | 8/2020 | Martin | ................... | H04W 4/90 |
| 2021/0110895 A1* | 4/2021 | Shriberg | ................ | G06F 40/20 |
| 2021/0154487 A1* | 5/2021 | Bongberg | ............. | G16H 40/63 |

* cited by examiner

ARTIFICIAL INTELLIGENCE FOR EMERGENCY ASSISTANCE

RELATED APPLICATIONS

This application claims the benefit of U.S. Provisional Patent Application No. 63/020,657 filed May 6, 2020 entitled "Artifical [sic] Intelligence For Emergency Assistance" by the same inventors, which is hereby incorporated by reference as if repeated herein in its entirety, including the drawings.

BACKGROUND

In the United States, approximately 6,300 public safety answering points (PSAPs) receive and manage about 250 million emergency calls annually—80% from mobile devices. Increasingly, PSAPs receive not only voice calls but also text messages. A host of multimedia options, including photographs and videos, are next on the horizon as PSAPs migrate to next generation infrastructure.

Under current PSAP protocols, an emergency dispatcher answers a call and may consult an electronic phone script or reference manual to ask for additional, relevant information or to provide advice to a caller. The effectiveness of the response is therefore limited by the human dispatcher.

There are some existing systems for emergency response systems, such as:

U.S. Pat. No. 10,049,153 which teaches a method for dynamically assigning question priority based on question extraction and domain dictionary;

U.S. Pat. No. 9,491,605 which discloses a text messaging system for emergency response system;

U.S. Pat. No. 10,582,053 which discloses a data gateway device; and

U.S. Pat. No. 8,515,565 which discloses a method and system for an integrated incident information and intelligence system. Each of these systems fails to adequately support PSAPs.

The present invention is therefore directed to the problem of improving the effectiveness of emergency response initiated by the PSAP.

SUMMARY OF THE INVENTION

The present invention solves these and other problems by coupling audio, visual and text data that arrives at a PSAP to a customized artificial intelligence (AI) engine. The AI engine is designed to detect certain activities and provide assistance to the human operators at the PSAP and beyond.

The present invention involves receipt of audio, visual, or text data to a PSAP by an artificial intelligence engine. Examples of suitable artificial intelligence engines include Microsoft Azure®, TensorFlow, Spark MLlib, Scikit-learn, PyTorch, MXNet, and Keras. In some embodiments, data is received through voice recognition or object recognition of data to the PSAP.

In the present invention, an artificial intelligence engine compares data received by the PSAP to a database with audio, visual, and text data from other emergencies. In some embodiments, the database will include audio recordings of prior emergency calls.

In the present invention, the artificial intelligence engine generates audio, visual, or text output based on queries to and analysis of information in the database. In some embodiments, the output will be an audio, visual, or text prompt for the human operator to ask one or more questions seeking information relevant to the emergency. For example, a caller may tell the operator someone stopped breathing. In response, the operator will be prompted to ask questions designed to assess the situation. The operator may ask about physical appearances of the person in crisis and recommend actions that can be taken based on the information provided by the caller. The invention will provide guidance to the operator on what questions to ask and recommendations to make in the emergency.

In some embodiments, the output will estimate the level of confidence concerning a possible diagnosis, injury, threat, or the nature of an emergency for further action by the caller. For example, an analysis of the database could provide an output prompt of 90 percent confidence that a stroke occurred based on data received by the PSAP.

In the present invention, the artificial intelligence engine aggregates and correlates data from multiple emergency contacts and the database to recognize patterns, whether within a specific PSAP or among PSAPs. In some embodiments, this includes geolocation data. For example, multiple contacts to a PSAP concerning possible victims of asphyxiation within close, geographic proximity could generate an output prompt of a potential gas leak, dispatch firefighters in addition to emergency medical services, or caution emergency response personnel to wear self-contained breathing apparatus. Similarly, public health outbreaks, such as COVID-19, could be detected based upon the types of calls received by various PSAPs.

Other objects, features, aspects, and advantages of the present invention will become more apparent from the accompanying drawings. The invention should not be limited to or by the embodiments and examples described above and includes all embodiments and examples within the spirit of the invention.

The present invention is unique, inter alia, because of its process for conducting the machine learning, the manner in which learning occurs, and its ability to enhance situational awareness for emergency response officials across the United States and European Union. First, the process followed for Carla to learn is different than any other technologies. Carla analyzes call data against existing emergency protocols. She then assesses the situation and makes a recommendation. Human operators will determine whether Carla successfully transmitted the right data. Human operators will tell her one of two things: (1) You were right because of X. Continue drawing this conclusion. (2) You were wrong because of Y. Do not continue drawing this conclusion. Second, the manner in which Carla learns is unique. While Microsoft tools are available online to customers, no technology thus far has united these wares to create a capability for PSAPs to more quickly diagnose emergency situations and enhance situational awareness for emergency response officials. Carla fills this gap by bringing together disparate tools to accomplish both of these things. Third, Carla looks across local, regional, and national boundaries for key words being transmitted to PSAPs and analyze it in the cloud. The upshot is an alerting mechanism to emergency response officials in any affected jurisdictions.

Carla is analyzing call data against standards created for use by the emergency management system. Carla is doing so across local, regional, and national lines as well to assess if a large-scale emergency incident is occurring. By anonymously aggregating call data in real-time she is predicting whether an incident is occurring and inform proper authorities. This system does not rely on questions. Rather, word associations will be used as part of this machine learning. For instance, if X number of calls in the Pacific Northwest state flu-like symptoms or certain types of respiratory issues in Y amount of time, Carla will predict a public health outbreak or mustard gas attack occurred, respectively.

According to one aspect of the present invention, an exemplary embodiment of an apparatus for emergency assistance includes a communications link to one or more public safety answering points, and artificial intelligence engine, and a database. The artificial intelligence engine is coupled via the communications link to the one or more public safety answering points. The artificial intelligence engine uses word associations for machine learning. The artificial intelligence engine receives, via the communications link, audio data, visual data, and text data being sent simultaneously to one or more public safety answering points. The database stores data from a plurality of other emergencies. The artificial intelligence engine queries said database upon receiving an incoming data. The artificial intelligence engine analyses said incoming data and said data from said plurality of other emergencies by recognizing key words and patterns in aggregated and correlated data. Based on said analyzing, said artificial intelligence engine generates one or more of the following messages: an audio message, a visual message, and a text message. Said artificial intelligence engine sends said one or more messages to a human operator, and receives feedback from the human operator regarding said one or more messages.

In the above exemplary embodiment, the feedback may includes one or more of the following: (i) the message was correct because of X; continue drawing this conclusion; and (ii) the message was wrong because of Y; do not continue drawing this conclusion.

In the above exemplary embodiment, the communication link may also be connected to one or more federal, state and local agencies in addition to the one or more public safety answering points, in which case the human operator may be in one of said one or more federal, state and local agencies.

In the above exemplary embodiment, data may be received by the artificial intelligence engine through voice recognition of audio from a telephone call to one of the one or more public safety answering points.

In the above exemplary embodiment, data may be received by the artificial intelligence engine through object recognition of visual data to one of the one or more public safety answering points.

In the above exemplary embodiment, the database may include audio data of a plurality of telephone calls to one or more public safety answering points.

In the above exemplary embodiment, the one or more messages may include an audio, visual, or text prompt to a human operator to ask one or more questions.

In the above exemplary embodiment, the one or more messages may include a statistical confidence level associated with any data analysis.

In the above exemplary embodiment, the one or more messages may include one or more potential medical diagnoses.

In the above exemplary embodiment, the one or more messages may include a predicted cause of an emergency.

In the above exemplary embodiment, the one or more messages may include an audio, visual, or text report of related emergencies to a same public safety answering point or other public safety answering points.

In the above exemplary embodiment, the one or more messages may include geographic coordinates or a map.

In the above exemplary embodiment, the data received by the artificial intelligence engine may be automatically added to the database for response to other emergencies.

In the above exemplary embodiment, the one or more messages may include a prompt to one or more emergency managers outside a public safety answering point that received the call.

According to another aspect of the present invention, an exemplary embodiment of a method for providing emergency assistance includes:

receiving audio, visual, or text data about an ongoing emergency at a public safety answering point;

comparing said audio, visual, or text data about said ongoing emergency with a database of other emergencies using an artificial intelligence engine;

recognizing key words and patterns in aggregated and correlated data by the artificial intelligence engine;

generating appropriate audio, visual, and text output for a human operator to respond to said ongoing emergency; and generating feedback to the artificial intelligence engine to aid in machine learning.

In the above exemplary embodiment, the feedback may include one or more of the following: (i) the message was correct because of X; continue drawing this conclusion; and (ii) the message was wrong because of Y; do not continue drawing this conclusion.

In the above exemplary embodiment, the said human operator may be situated in one of a plurality of federal, state and local agencies distinct from said public safety answering point.

In the above exemplary embodiment, the method may include receiving data by the artificial intelligence engine through voice recognition of audio from a telephone call to one of the one or more public safety answering points.

In the above exemplary embodiment, the method may include receiving data by the artificial intelligence engine through object recognition of visual data to one of the one or more public safety answering points.

In the above exemplary embodiment, the method may include storing in a database audio data of a plurality of telephone calls to one or more public safety answering points.

In the above exemplary embodiment, the method may include sending an audio, visual, or text prompt to a human operator to ask one or more questions.

In the above exemplary embodiment, the method may include sending a statistical confidence level associated with any data analysis.

In the above exemplary embodiment, the method may include sending one or more potential medical diagnoses.

In the above exemplary embodiment, the method may include sending a predicted cause of an emergency.

In the above exemplary embodiment, the method may include sending said one or more an audio, visual, or text reports of related emergencies to a same public safety answering point or other public safety answering points.

In the above exemplary embodiment, the method may include sending geographic coordinates or a map.

In the above exemplary embodiment, the method may include adding data received by the artificial intelligence engine automatically to the database for response to other emergencies.

In the above exemplary embodiment, the method may include sending a prompt to one or more emergency managers outside a public safety answering point that received the call.

According to yet another aspect of the present invention, an exemplary embodiment of a method for managing and processing data from a plurality of public safety answering points includes:

receiving audio data, visual data, and text data related to ongoing emergencies being received at public safety answering points;

comparing the audio data, visual data, and text data about the ongoing emergencies with one or more databases storing relevant data from other emergencies using an artificial intelligence engine;

identifying key words and patterns among the compared data by the artificial intelligence engine;

generating appropriate audio, visual, and text output for human operators to respond to the ongoing emergencies; and generating continuously feedback to the artificial intelligence engine to aid in machine learning based on the generated output; wherein the feedback includes: (i) "the message was correct; continue drawing this conclusion"; and (ii) "the message was wrong; do not continue drawing this conclusion."

The aforementioned exemplary embodiments may be combined in various ways without departing from the scope of the present invention. Moreover, the aforementioned exemplary embodiments may be embedded in non-transitory computer readable media, such as used by computers and the like.

BRIEF DESCRIPTION OF THE DRAWINGS

The accompanying drawings are included to provide a further understanding of the present disclosure and are incorporated in and constitute part of the specification. The drawings illustrate exemplary embodiments of the present disclosure and, together with the description, explain the principles of the present disclosure. The diagrams are for illustration only and not as a limitation of the present disclosure.

DETAILED DESCRIPTION

The present invention is designed to help emergency call centers save lives through increased accuracy and efficiency, and to become the frontline of situational awareness for the United States homeland security operators.

Known as Public Safety Answering Points (PSAPs), emergency call centers are on the front lines of emergencies. This is the business PSAPs are in. PSAPs are constantly faced with emergencies both big and small. In fact, there are 250 million emergency calls made to PSAPs across the United States annually. Countries throughout the European Union are in a similar position fielding millions of emergency calls annually as well.

In addition to be the front line for local emergencies, PSAPs are positioned to serve broader regional and national roles in homeland security. Using artificial intelligence (AI), PSAPs can transform into the de facto first line of homeland security. PSAPs receive information as incidents unfold in real-time. This information can serve as vital intelligence and enhance situational awareness for first responders and law enforcement.

The present invention provides a bridge that connects PSAPs to the homeland security enterprise. Members of the public carry hand-held technologies that can provide valuable data to improve any emergency—whether big or small. Yet PSAPs traditionally have been stuck in the 20th Century using outdated systems. The call centers typically support individual voice-only calls.

The message is simple: The time is now to revolutionize emergency call centers in the industrialized world to save lives and enhance security. Data from multiple sources can be brought together, in real-time, to give call centers a full operating picture and provide this information to first responders and to the men, women, and children calling the operators. Harnessing this data will revolutionize call centers and create the ability for us to protect citizens and save lives in ways currently impossible.

AI and data fusion will play a significant role in fully realizing the potential of call centers. Specifically, AI can both help improve response times to any number of daily emergencies and enhance situational awareness for the Nation's homeland security operators. The present invention provides an AI solution for a call center to enable call centers to migrate globally to next generation technologies. The present invention makes it possible for emergency call systems to utilize the full range of capabilities of modern communications.

AI and data fusion/dissemination improves emergency response and enhance homeland security. For example, the present invention enables call takers to more quickly diagnose health emergencies and thereby provide correct immediate response actions while dispatching EMS, police, or fire resources—which could mean the difference of several critical minutes on the initiation of patient stabilization while EMTs arrive at the scene.

The present invention will also enable homeland security operators to quickly detect public health emergencies by aggregating real-time emergency call data and connecting the dots between specific incidences to create an understanding of a broader incident and provide alerts to emergency managers. What are currently treated as individual, siloed events across localities can be aggregated to determine whether the calls are part of a larger, singular event requiring a coordinated response.

The present invention using AI and data fusion solutions for call centers leverages modern data and multi-media communications to make operators more effective, enhance response capabilities, and save lives.

The present invention: (i) assists call takers with incidents, such as health emergencies, so that immediate actions can be taken through data fusion and real-time analysis; and (ii) assists homeland security officials detect pending emergencies, such as a public health outbreak, more quickly than is now possible.

The existing 9-1-1 (United States) and 112 (European Union) emergency call systems are legacy systems designed decades ago on voice-centric telephone networks. In both cases, the system operates with "dumb" end points where the information reporting an emergency is relayed only over a voice call and received as a verbal description. Fifty years ago, the general public considered such a system as a major advancement to improve emergency response. Today, however, we live in a very different environment where citizens enjoy 100% adoption of mobile communications that is multi-media. Consequently, the emergency call number systems around the globe need to catch up with the citizens they seek to protect and serve.

Over the years, public safety answering points (PSAPs) have adopted more sophisticated Call Taking (CT) and Computer Aided Dispatch (CAD) systems that receive and process emergency calls to dispatch the appropriate emergency responder (e.g., police, fire, or EMS) relaying as much information as possible. But that information remains largely based on verbal communication between a caller and PSAP.

With respect to medical emergencies, PSAPs depend on several programs that have been developed by the medical community which relay protocols that a call taker can follow. In some PSAPs the medical protocols are on old index card flip charts. Some exist in an electronic format. In their electronic format, the call taker will input key words being said by the caller prompting questions by the call taker. As the call taker enters the responses additional questions or suggestions will pop up to assist the call taker. While these programs are based on extensive medical research, they still require manual input and manual navigation.

Today, about 80% of all emergency calls are made from mobiles phones. Most of these calls come from smart phones which can do far more than relay a voice communication. Smart phones imbed location data from multiple sources—GPS, cell network triangulation, and Wi-Fi—allowing users to text, share photos, videos, and other data. This information can be critical in life-threatening situations.

Furthermore, there is very little relationship between 9-1-1/112 with the managers and organizations that oversee identifying and coordinating response to a large-scale security threat. Emergency managers need as many sources of information as possible and in many cases, the first indication of a serious event may be occurring could come from emergency calls from citizens seeking help from first responders. The present invention improves the relationship between emergency calls from citizens into PSAPs and the broader emergency management system.

The present invention addresses two distinct issues related to PSAP operations. The first aspect is the way in which the present invention improves the speed and accuracy in which call takers can diagnose and provide recommended actions for health-related emergencies. Currently, PSAPs utilize a protocol system, named ProQA, created by an organization called "Priority Dispatch." Depending upon the PSAP, some have these protocols organized in index flip cards. More advanced PSAPs will have this system in electronic form and integrated into their Call Taking (CT) and Computer Aided Dispatch (CAD) system. The system requires the call taker to manually input key words expressed by the caller. The key words then prompt the call taker to ask questions, input the additional responses, and continue following prompts through a drop-down screen. Although the research behind the actual protocols is sound, the system is only as effective as the call taker inputting the information received from the caller. Manual inputting is time consuming, potentially wasting seconds or minutes of critical time, and prone to error.

The second aspect overcomes the weakness of current 9-1-1 and 112 systems handling each call in a stovepipe. Data from these calls are maintained and contained within the specific PSAP into which the calls were delivered and handled. Emergency calls, when viewed in aggregate, can warn of a larger public safety crisis. This can be true not only within a specific PSAP as well calls coming into different PSAPs. Consider a bio-terrorist attack using an invisible chemical agent. The first sign a crisis exists would be through calls received by 9-1-1 and 112 call centers. Calls that appear unrelated may in fact be part of a larger crisis requiring a coordinated response. By the time hospital emergency rooms are full the crisis could have spread beyond a manageable point for public health officers. Currently, there is no system that allows anonymized emergency call data to be aggregated and analyzed in real-time and signal to emergency managers that a large-scale event may be unfolding. The present invention turns PSAPs into the first line of homeland defense as the "eyes and ears" of what is happening across communities throughout the United States and the European Union. As a result, public health incidents such as the one described above may go unnoticed for hours or even longer.

The present invention comprises a cloud-based AI subscription service that PSAPs can use to fuse and interpret multi-source data in real-time to assist call takers and emergency responders with accurate, responsive, and timely information to save lives and provide security. Termed "Carla", the present invention has a name because our product is not a thing, but rather a service that is very personal. Carla is an assistant that helps emergency call takers do their jobs better because Carla is there to help guide them on how to handle intense calls that may involve serious health situations. Carla is also an assistant to emergency managers by alerting them when Carla sees certain trends, troubling patterns, or identifies key words and phrases that require immediate attention.

Carla is not going to replace anyone. Carla's role is that of a trusted helper who gets smarter and better over time that is always available to our customers. Carla will not replace the well-researched and commonly used protocols that call takers use today. But Carla will replace how call takers can access those protocols as well as improve upon them. Carla will also create the first bridge between emergency call data and emergency managers who need to be alerted to situations in which only Carla is smart enough to connect the dots, detect patterns and identify concerns that emergency managers need to know.

Carla resides in a cloud-based service, Microsoft Azure. This cloud-based approach avoids the pitfalls of installations or any equipment concerns. If the PSAP has computers with a minimal amount of computing power, Carla will work for them. Carla comprises a new platform dimension for PSAPs where Carla's services can and will expand into many areas of PSAP operations. Carla is designed for easy integration with existing PSAP technology. The many talents and abilities of Carla will expand over time and Carla will be designed and built from the beginning with the capabilities of learning more and serving more and be easy to access.

From the perspective of the call taker in a PSAP, Carla will always on and available. The call taker will always have the discretion to follow Carla's guidance or ignore it. Carla will always be listening. Initially, Carla will appear in a pop-up window and provide guidance on health-related emergencies and suggest a series of questions for the call taker to ask. Carla listens to the dialogue and continues providing the call taker guidance as the caller shares more information. Once the caller has provided enough information, Carla suggests a diagnosis, which will include an assessment how accurate her prediction might be and the level of confidence the call taker can take in her diagnosis. Carla will continue after reaching a conclusion on a diagnosis to suggest actions that can be taken to address the health emergency until EMTs arrive.

Carla's assistance to the call taker begins with being a "listener" because today, most PSAPs can only receive voice calls from citizens seeking help. However, Carla will be designed keep pace with PSAPs as they migrate to receive emergency text messages and can operate in a NG 9-1-1/NG 112 environment where citizens can share photos and videos. As PSAP emerge into multi-media usage, Carla will always be a step ahead and capable of helping call takers analyze all these sources of information and providing a helping hand by using the latest technologies available to know as much as possible from a photo or video.

From the perspective of emergency managers, Carla will provide alerts concerning possible incidents requiring a coordinated response. In this case, Carla will be the first of her kind. Currently, PSAPs do not have this capability. Or, said another way, emergency operations centers (EOCs) and emergency managers currently have no means to receive alerts derived through real-time analysis of emergency call data and create an alert system that will enhance situational awareness. Now, Carla is not going to be sharing actual emergency call data. Even with Carla's assistance, PSAPs will always have control over their data and PSAPs will be able to continue managing their emergency call data in accordance with their existing regulations. What Carla will do, however, is analyze all emergency calls, looking only for patterns and subject matters that may be of concern to emergency managers and the location from where those calls came from. Carla, while still protecting the data—especially any personally identifiable information—will send alerts to designated EOCs and or emergency managers who have a need to know this information.

EOCs and emergency managers that receive these alerts from Carla can display the provided information on software dashboards already available in the market. Thus, Carla's role is to provide a highly targeted analysis of emergency call data and send alerts to designated EOCs and emergency managers. If those EOCs or emergency managers desire to obtain more information about a specific call, they will have to pursue that information through normal challenges.

Finally, because of how Carla is going to be designed from the start, Carla has erased installation and distribution challenges faced by PSAPs and EOCs for existing technology solutions. Residing in the cloud is itself transformative for the emergency response system and provides many advantages.

The present invention provides a cloud-based approach for an AI solution designed specifically for PSAP operations. Other AI solutions targeting the emergency response system are either free-standing systems that do not integrate with existing Call Taking (CT) and Computer Aided Dispatch (CAD) systems or they are non-hosted solutions.

Secondly, the present invention improves upon the current protocol system that relies upon manual input, improving the speed and ease in which the call taker receives "advice" from the AI solution increasing the accuracy of diagnosing problems and recommending steps to be taken by the caller while EMTs are enroute.

Carla is the only solution that can detect large-scale crises by bridging the data divide between emergency call data and emergency managers.

Carla operates in the background regardless of whether a call taker wants to utilize Carla's guidance. Also, there is no training required to utilize Carla. Carla simply provides her guidance and assistance, appearing in a window on the call taker's desktop.

The way 9-1-1 and 112 communities currently process emergency protocols (e.g., ProQA) is through flipping index cards or manually inputting information in a drop-down program. These current solutions divert the call takers attention and take up valuable time and can distract. Carla will replace this antiquated approach with an intelligent and responsive system of helping the call taker. Not only will Carla be more accurate, decrease call taker time, and increase focus but access to Carla will be significantly cheaper than the old method. ProQA costs nearly five times more than the Proposer's anticipated price to access Carla.

Emergency managers, especially public health officers, will need Carla to enhance their situational awareness.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Artificial Intelligence System for Emergency Calls

Figure 1:
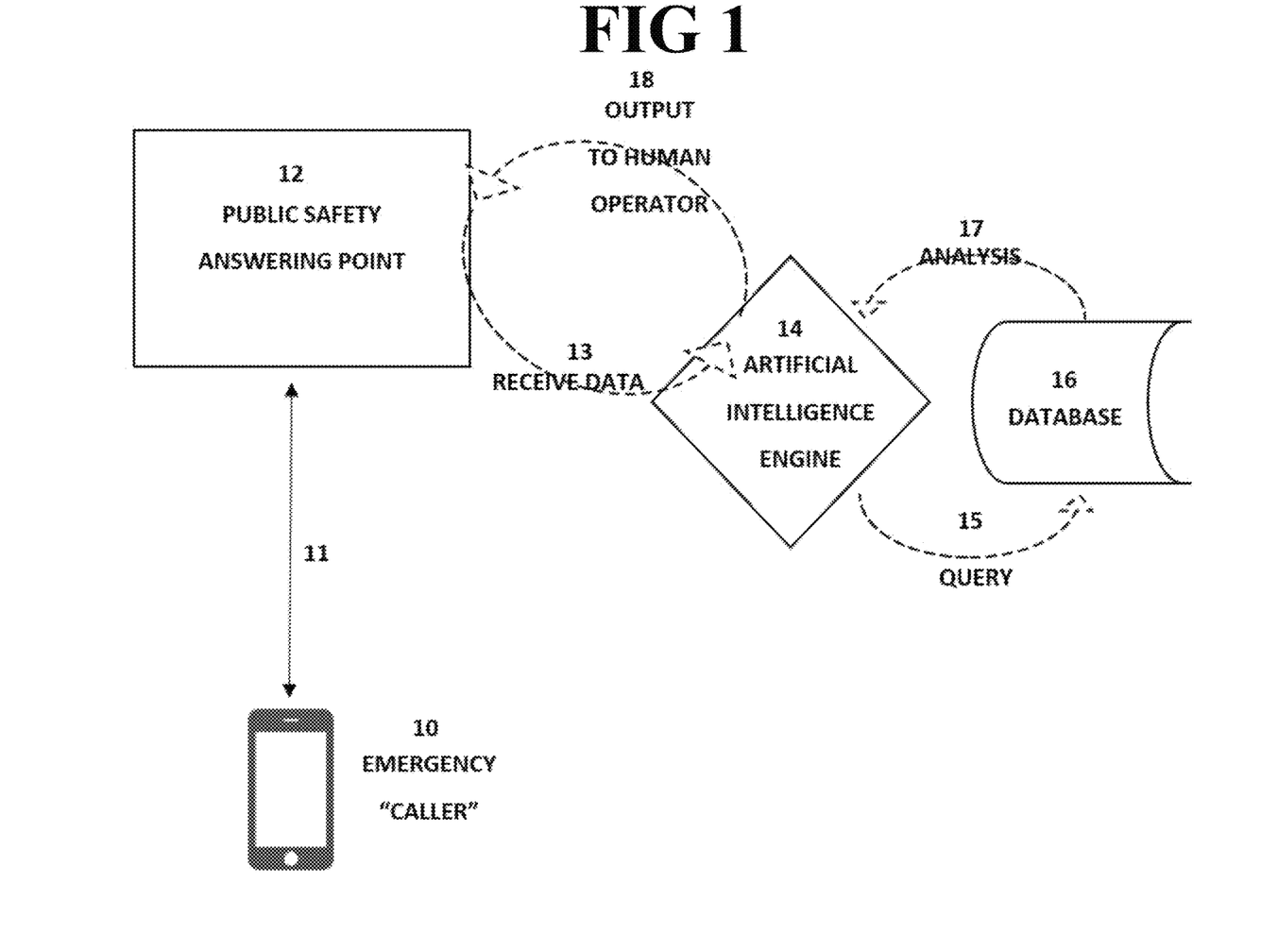
FIG. 1 depicts a schematic diagram of the present invention in which various embodiments of the of the present invention can be implemented according to a first aspect of the present invention.

Turning to FIG. 1, the present invention comprises a cloud-based artificial intelligence process that utilizes a Q&A bot trained through a machine learning function to assess, analyze, and diagnose an emergency when an emergency call is placed to an emergency call taking center or public safety answering point (PSAP). The AI system of the present invention assists emergency call takers diagnose and recommends immediate actions in emergency situations to assist with first aid and triage. Further, the present invention enhances situational awareness to homeland security professionals (e.g., emergency operations centers, public health authorities) through pattern and anomaly detection.

The system of FIG. 1 may include other communication networks and links such as call handling equipment (CHE), gateway devices, dispatcher CAD devices, a telephony network, an IP-based network, and a cloud-based computer-aided dispatch (CAD) system. These links and devices may all be located within a public safety answering point (PSAP) 12. In some embodiments, the CHE may be located off-site and connected to a private network of the PSAP 12, and the gateway device is located with and connected to the CHE. In alternative configurations, different and/or additional components may be included in the system environment, or the locations and connections between components may differ. Additionally, functionality described in conjunction with one or more of the components shown in FIG. 1 may be distributed among the components in a different manner than described in conjunction with FIG. 1 in some embodiments.

The PSAP 12 is an emergency call taking center. PSAPs typically include telephony infrastructure for receiving emergency calls and routing the calls to dispatchers working at the PSAP. PSAPs also include dispatch equipment that dispatchers use to communicate information about the emergency calls to appropriate first responders (e.g., police, fire, or medical responders). CHE is the call handling equipment located on-site in the PSAP 12 or connected to a private network of the PSAP. CHE can include various hardware devices, such as servers, routers, and switches, for supporting delivery of emergency calls to dispatchers. In some embodiments, CHE includes customer premises equipment (CPE). For example, one or more CPE servers connect the PSAP 12 to the telephony network, and handle and process telephony aspects of emergency calls. In addition to CPE servers, CPE can also various other devices located within the PSAP 12, such as routers and telephony switching systems used by dispatchers to receive calls. In other embodiments, CHE may include Next Generation Core Services (NGCS) equipment or other types of Functional Elements (FE) or systems that support delivery of Next Generation 9-1-1 (NG911) emergency calls.

The telephony network 11 is a network that connects callers making emergency calls to PSAPs 12. For example, the telephony network 11 may be the legacy selective router (LSR) network or some other component of the public switched telephony network (PSTN). Within the telephony network 11, a call from a caller, such as caller 10, may be routed to a particular PSAP 12 by a routing facility based on the location of the caller. The call routing may be handled by an Enhanced 911 (E911) system or NG911 system.

The caller 10 use any device enabled for voice calls to connect to the PSAP 12. For example, the callers 10 may connect to the telephony network 11 using landline phones, mobile phones, voice over IP (VoIP) phones, etc. The callers 10 access the PSAP 12 by dialing a standard emergency number, such as 911 in the United States or 112 in the European Union. While one caller 10 is shown in FIG. 1, it should be understood that the PSAP 12 typically handles calls for a region (e.g., a city, county, or state) that includes many more potential callers, e.g., thousands or millions of callers. Furthermore, the PSAP 12 may be configured to handle emergency calls from more than two callers 10 simultaneously.

The AI system uses a language identifier and voice recognition to "listen in" on emergency calls from a caller 10 via a communication link 11 received in a PSAP or first responder dispatch center 12. When deployed, the AI system 14 will be integrated into the PSAPs' call taking and/or computer aided dispatch (CAD) system. The call taker will not be required to "turn on" access to the AI system which will always be "on" listening and learning from emergency calls in PSAPs and dispatch centers. While call takers will have a "do not show" option and opt out of receiving guidance from the AI solution, the system will always be operating and listening in on every emergency call 13. This will enable ongoing training and testing so that machine learning can occur almost constantly. It allows the AI system to detect patterns and anomalies while analyzing all incoming emergency calls within a PSAP and over a region that includes multiple PSAPs. The AI engine 14 receives data 13 from the PSAP 12, queries a database of prior calls 16, and performs analysis 17 on the queried data response to create an output 18 to a human operator.

Figure 2:
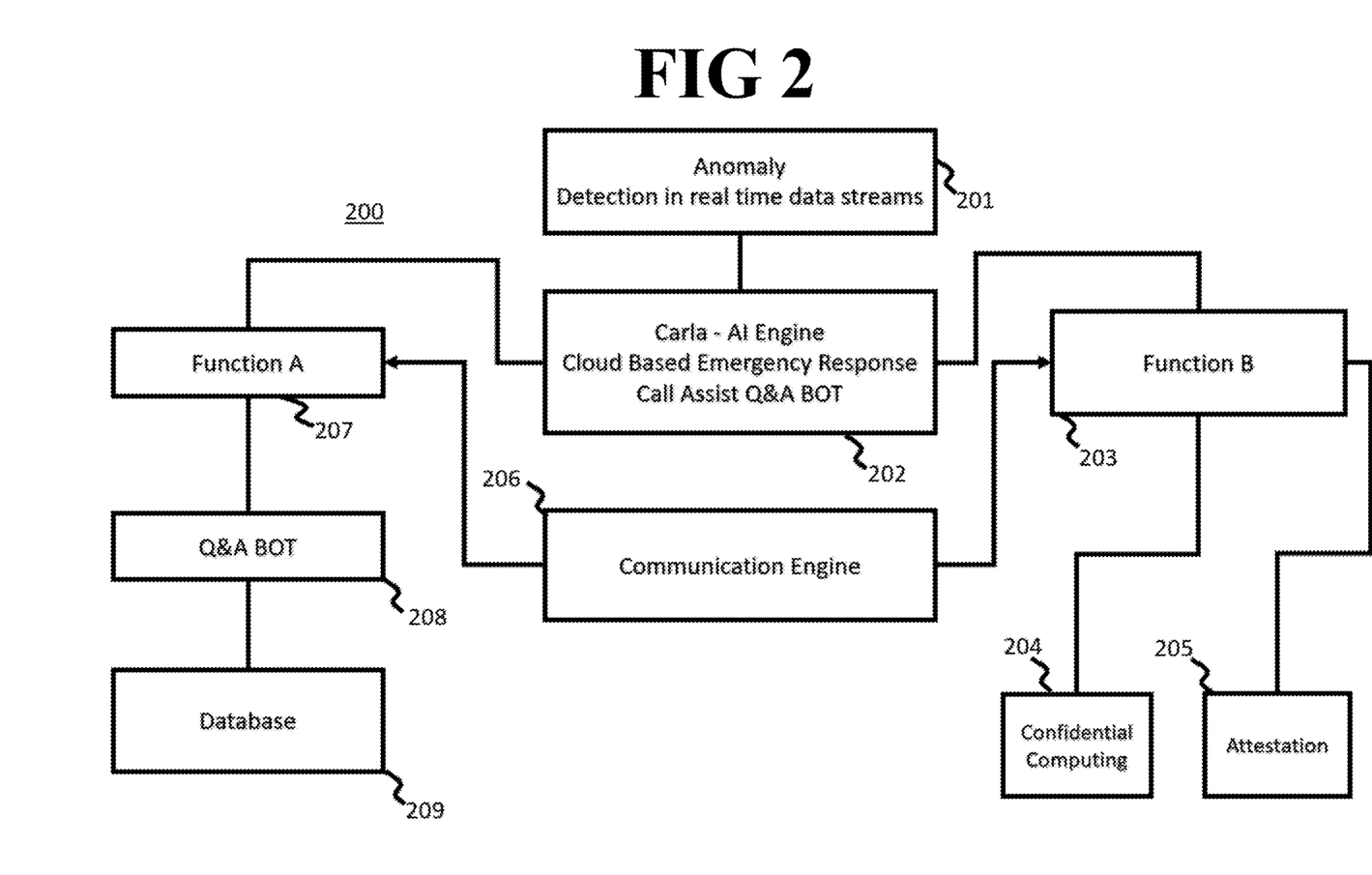
FIG. 2 depicts an exemplary embodiment of a callout diagram of the artificial intelligence engine and database used in various embodiments of the present invention according to another aspect of the present invention.

Referring to FIG. 2, shown therein is a framework 200 for the present invention for an anomaly detection in real-time data streams (201). At the center of the framework is the AI Engine (termed Carla), which provides a cloud based emergency response call assist question and answer BOT (202).

The present invention includes at least two main functions. Function A (207) and Function B (203). Function A 207 includes assisting emergency call takers to diagnosis and recommend immediate actions in emergency health situations. Function B 203 includes providing emergency responders enhanced situational awareness of public health events.

Communications Engine 206 enables communications between the two functions 207, 203.

Function A includes a Q&A BOT 208 that is an intelligent, enterprise-grade BOT that allows for control of data, comprehensive SDK with tools to connect the Carla BOT across multiple channels and devices with the ability to speak, listen and understand users. A database 209 is coupled to the Q&A Bot 208. The database stores information from other emergencies, among other things.

Function B includes confidential computing 204 and attestation 205. Confidential computing 205 includes protecting data in use from malicious insiders with administrative privilege or direct access. Confidential computing 204 provides a safeguard against hackers and malware that exploit bugs in the operating system, application or hypervisor. Confidential computing 204 protects against third party access without consent. Attestation 205 verifies the identity of code running inside them. Attestation 205 validates code identity to determine whether to release restricted information.

There may also be a combination of three functions that interact to create two unique inventions.

Function A (Cloud Storage). Function A is the security-focused, de-centralized storage and transportation of redundant data component. It is where the Q&A bot stores its information and the networking component; the hub for all incoming and outgoing communication, all stored in the cloud and includes role-level access of information and PII scrubbing. Utilizing an intelligent, enterprise-grade bot that allows for control of data with comprehensive SDK with tools to connect the AI system across multiple channels and devices with the ability to understand users using voice, photos, videos, and text to communicate with a PSAP or dispatch center.

Multiple calls can be stored here simultaneously. As people call-in to PSAPs, information is stored in the cloud on a secure server. Information will be streamed across the Internet and stored remotely on the cloud. As the networking component of the AI system and hub for all communications, information will be securely sent through multiple points of infrastructure ensuring confidential computing and storage of information across the network. The system will use end-to-end encryption to ensure secure communication and protection of all data.

Function B (QnA Bot). Our AI system utilizes the Microsoft Cortana QnA bot, an intelligent, enterprise-grade bot that will host the emergency response database protocols and allow for data controls. The bot is a comprehensive SDK with tools to connect the AI system across multiple channels and devices with the ability to understand users using voice, photos, videos, and text to communicate with a PSAP or dispatch center.

The QnA bot is where all the listening happens, and the answers given. The QnA bot is running in the background, looking for keywords, and comparing data and information stored in Function A.

The QnA bot is where our AI system will create customizable skills for the system providing emergency responders enhanced situational awareness regarding emergency incidents (e.g., public health outbreaks) and other events of homeland security concern. This is done through the aggregation of local, regional, or national call center data which provides alerts to designated public safety and homeland security officials who need to receive alerts based on that analysis. The system will utilize data sources and training related to specific public safety concerns or incidents, identified by emergency managers and public safety officials, to send alerts to designated public safety agencies and personnel.

In the QnA bot, we create customized skills to listen for and match key words from the emergency response database. One of the customized skills will be to cross-reference words spoken on the call with a database vocabulary to find matches that help address the situation based on key words. During training and testing, humans will compare how anomaly detection works. If correct, the machine will be instructed to continue this thought pattern. If incorrect, the machine will be instructed to not continue this thought pattern. The QnA bot will be subjected to a series of calls and a human will determine whether the bot provided the correct information from the database. The QnA bot will conduct key word searches compared against emergency response protocols. Our AI system will recognize speech, text, photos, and video provided from emergency calls to assess, analyze, make predictions, and suggest recommendations to call takers using machine learning data.

This invention also brings together machine learning and language capabilities to PSAPs. Anomaly detection of the data streams, terms, phrases, and any other utterances will help the QnA bot "learn" based on human correction.

Function C (Learning Mechanism). The third function is the learning mechanism and the location of the "intelligence" of our AI system. It takes the information that is stored in Function B, in the cloud, and uses the event hub and QnA bot to train the information in the data factory using the dashboard. The learning mechanism will program a unique database which will compose a system that will generate "truths" based on data and human guidance that a machine can use later. What is novel is its use of various techniques to create these "truths." Further, it instructs (e.g., train or test) the data factory as to why it was right or why it was wrong. This results in more precision as the machine learns through further training and testing. ML Gyms will also train the machine to make associations and outcomes.

The learning mechanism will have anomaly detection of real-time data streams. Cortana Intelligence IT Anomaly will manage stored calls that have been recorded and can be analyzed by a human user to correct the system's behavior for future calls. Cloud machine learning anomaly detection API to learn and react to anomalies from both historical and real-time data. This minimizes human-in-the-loop, otherwise needed for recalibrating thresholds for detect missing anomalies and minimizing false positives.

Applications written here explain to the machine between right and wrong. Interacting with the stored information. System that will generate a truth. Truth will be generated by people based on data. Process would be to create a set of truths that a machine could re-use later. Patentable: Use several techniques to provide the machine these truths. Human analysts. Machine decision corrected by people as well as training the machine the "why" behind "right" and "wrong" decisions. This will be done by preparing scripts of right and wrong tested against scenarios. Sets of scripts can be run against in ML Gyms.

Synchronization: How all 3 functions interact with each other. All the functions above combine to result in a unique functionality not currently enjoyed by the U.S. emergency response community.

The system will run off a cloud-based Windows/SQL server AND will continue to run when not connected to the Internet. Hybridization of applications utilizing remote servers allows for QnA bot, machine learning, anomaly detection, and emergency response alert functions to run simultaneously across an interconnected platform.

This invention utilizes Azure storage and Microsoft tools to analyze data that is streamed and visualize on a dashboard. Our unique contribution is that it provides learning guidance to the bot as to how to use the databases and provide the desired results.

Figure 3:
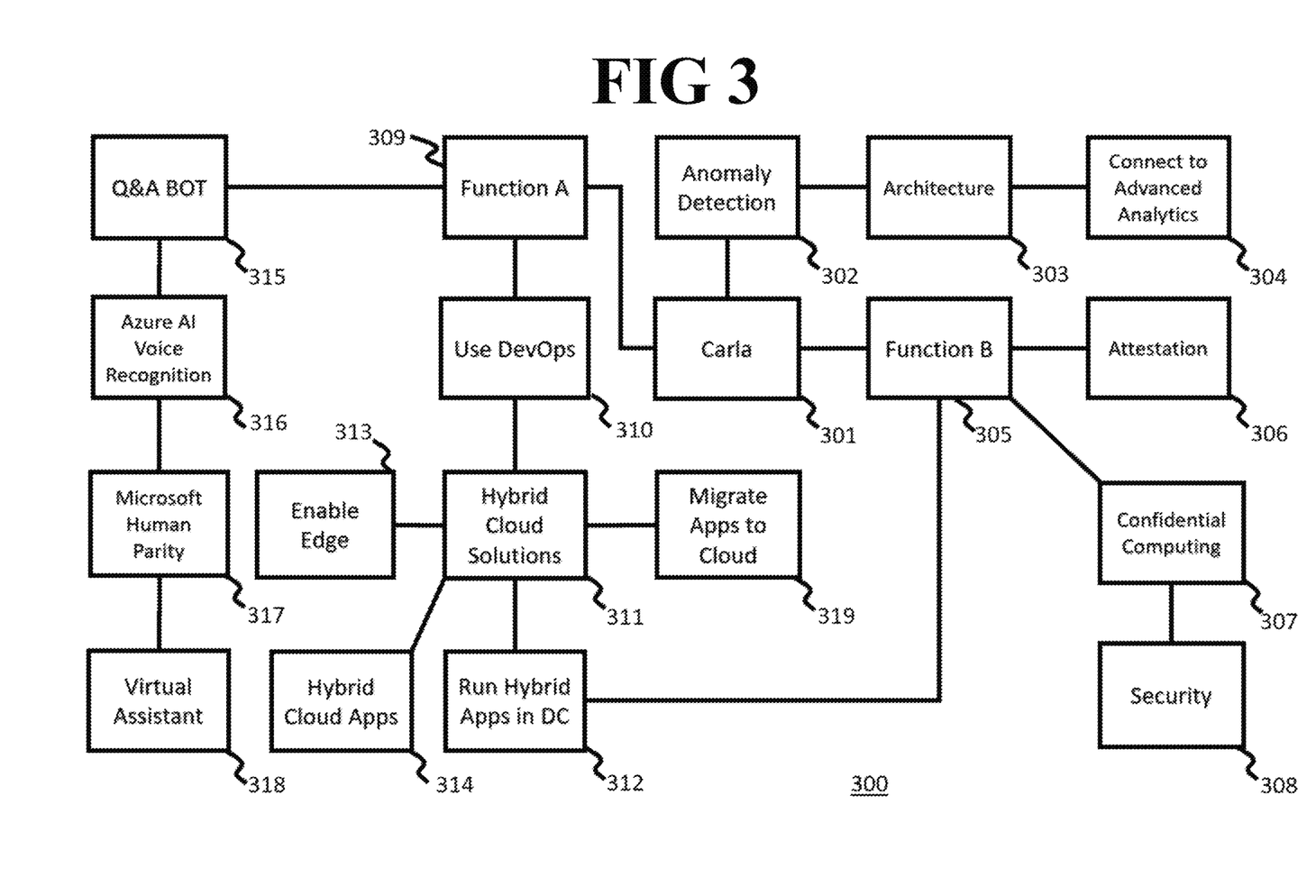
FIG. 3 depicts an exemplary embodiment of a software framework used for the present invention according to yet another aspect of the present invention.

Turning to FIG. 3, shown therein is another exemplary embodiment of a software framework 300 in which the AI engine of the present invention 301 (Carla) operates. Carla 301 is a Microsoft Azure cloud based, emergency response call assist Q&A bot. Carla will use a language identifier and voice recognition to "listen in" on emergency calls. Carla is integrated into the PSAP's call taking (CT) and/or computer aided dispatch (CAD) system. The call taker will not be required to "turn on" access to Carla. Carla will always be "on" listening and learning from all the emergency calls in the PSAPs in which she is deployed. A "do not show" option exists for call takers who choose not to receive guidance from Carla, but Carla will always be operating and listening in on every call.

Anomaly Detection in Real-time Data Streams 302 is used by Carla. Cortana Intelligence IT Anomaly Insights solution helps IT departments within large organizations quickly detect and fix issues based on underlying health metrics from IT infrastructure (CPU, Memory, etc.), services (Timeouts, SLA variations, Brownouts, etc.), and other key performance indicators (KPIs) (Order backlog, Login and Payment failures, etc.) in an automated and scalable manner.

Figure 4:
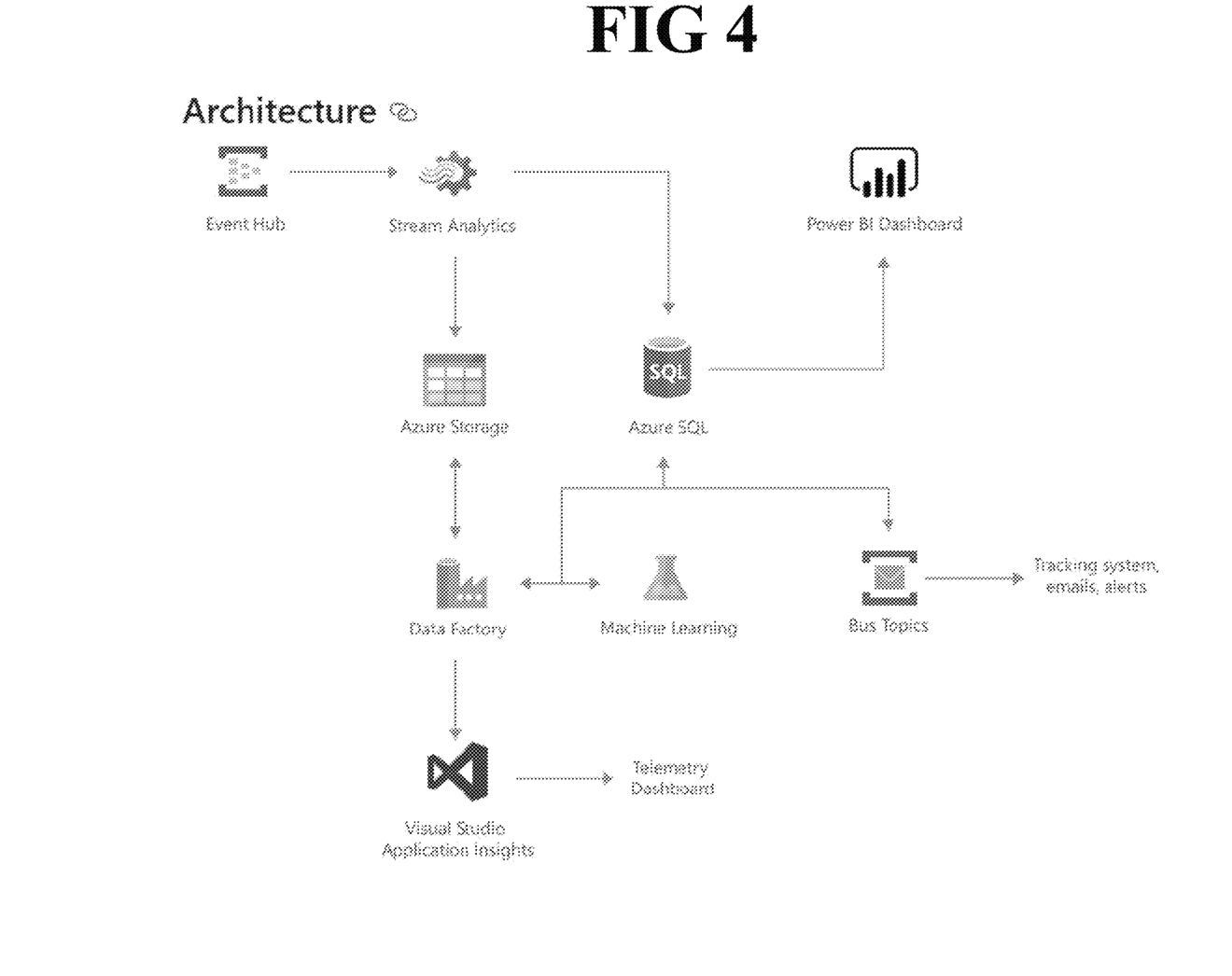
FIG. 4 depicts the architecture for the Microsoft Azure AI used in in various embodiments of the present invention.

FIG. 4 shows the architecture 303 for the Microsoft Azure AI used in the present invention.

In element 304 the system connects with an advanced analytics system, such as Cortana Intelligence IT Anomaly Insights. Today, modern services generate large volumes of telemetry data to track various aspects of operational health, system, performance, usage insights, business metrics, alerting, and many others. However, monitoring and gathering insights from this large volume of data for IT departments is often not fully automated and error prone (generally using rules or threshold based alerts), making it hard to effectively and accurately determine the health of the system at any given point in time. Cortana intelligence IT anomaly insights is based on Cortana Intelligence Solutions (for easy deployment of Azure services) and Azure machine learning anomaly detection API (for fully automated tracking of historical and real time data).

In element 302, anomaly detection in real-time data streams occurs using Cortana Intelligence IT Anomaly Insights. This solution helps IT departments within large organizations quickly detect and fix issues based on underlying health metrics from IT infrastructure (CPU, Memory, etc.), services (Timeouts, SLA variations, Brownouts, etc.), and other key performance indicators (KPIs) (Order backlog, Login and Payment failures, etc.) in an automated and scalable manner.

Function A 309 assists emergency call takers to diagnosis and recommend immediate actions in emergency health situations.

Function B 305 provides emergency responders enhanced situational awareness of public health events through anonymous aggregation of local and regional call center data and provides alerts to designated public safety officials who need to receive alerts based on that analysis. Carla is integrated into existing call taking (CT) and computer aided dispatch (CAD) systems that PSAPs currently use.

Confidential computing 307 protects data in use from malicious insiders with administrative privilege or direct access. Safeguard against hackers and malware that exploit bugs in the operating system, application, or hypervisor. protect against third party access without consent. Example: SQL server always encrypted technology. With the use of confidential computing, SQL always encrypted protects sensitive data in use while preserving rich queries and providing in place encryption.

Security 308 is a key driver accelerating the adoption of cloud computing, but it's also a major concern when you're moving extremely sensitive IP and data scenarios to the cloud. There are ways to secure data at rest and in transit, but you need to protect your data from threats as it's being processed. Now you can. Confidential computing adds new data security capabilities using trusted execution environments (TEES) or encryption mechanisms to protect your data while in use. TEES are hardware or software implementations that safeguard data being processed from access outside the TEE. The hardware provides a protected container by securing a portion of the processor and memory. Only authorized code is permitted to run and to access data, so code and data are protected against viewing and modification from outside of TEE.

Attestation in element 306 verifies the identity of code running inside them. Validate code identity to determine whether to release restricted information. Verification is simplified utilizing attestation services.

Q&A BOT 315 is intelligent, enterprise-grade BOT that allows for control of data. comprehensive, SDK with tools to connect the Carla BOT across multiple channels & devices, with the ability to speak, listen, and understand users.

Azure AI for voice recognition 316 is the capability of a machine to imitate intelligent human behavior. Through AI, machines can analyze images, comprehend speech, interact in natural ways and make predictions using data.

Microsoft® 317 is the first to achieve human parity in vision (object recognition), speech (speech recognition) and language (machine translation).

Figure 5:
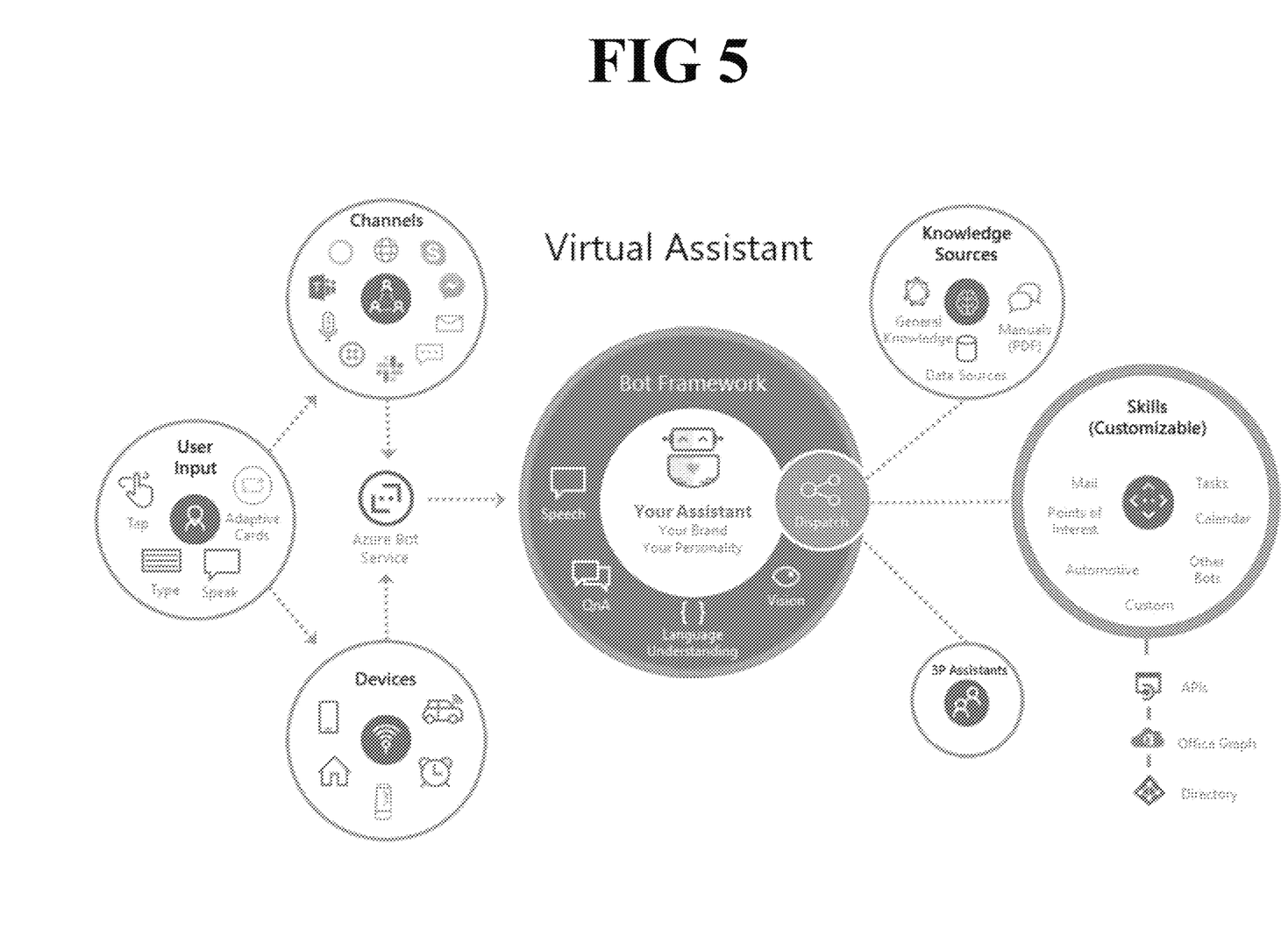
FIG. 5 depicts the virtual assistant used in in various embodiments of the present invention.

FIG. 5 depicts the virtual assistant 318 used in the present invention.

In element 310, DevOps in Azure is used in the present invention to develop apps as needed.

In element 311, hybrid cloud solutions deliver application consistency, seamlessly manage data, addresses security and management and takes on new business scenarios across on-premises cloud, and edge environments.

In element 312 hybrid apps are run in the data center. Azure stack HCl solutions are used to run virtualized apps on-premises, to enjoy hybrid cloud benefits while meeting regulatory and connectivity requirements.

In element 319, apps can be migrated to the cloud.

In element 314, hybrid cloud applications are a single system that has components running in both Azure and Azure Stack. This solution blueprint is relevant to establishing connectivity for any application that involves communications between the Azure public cloud and on-premises Azure Stack components. Hybrid connectivity is a foundational blueprint that will be applicable to most Azure Stack solutions. See FIG. 6 for more details.

Figure 6:
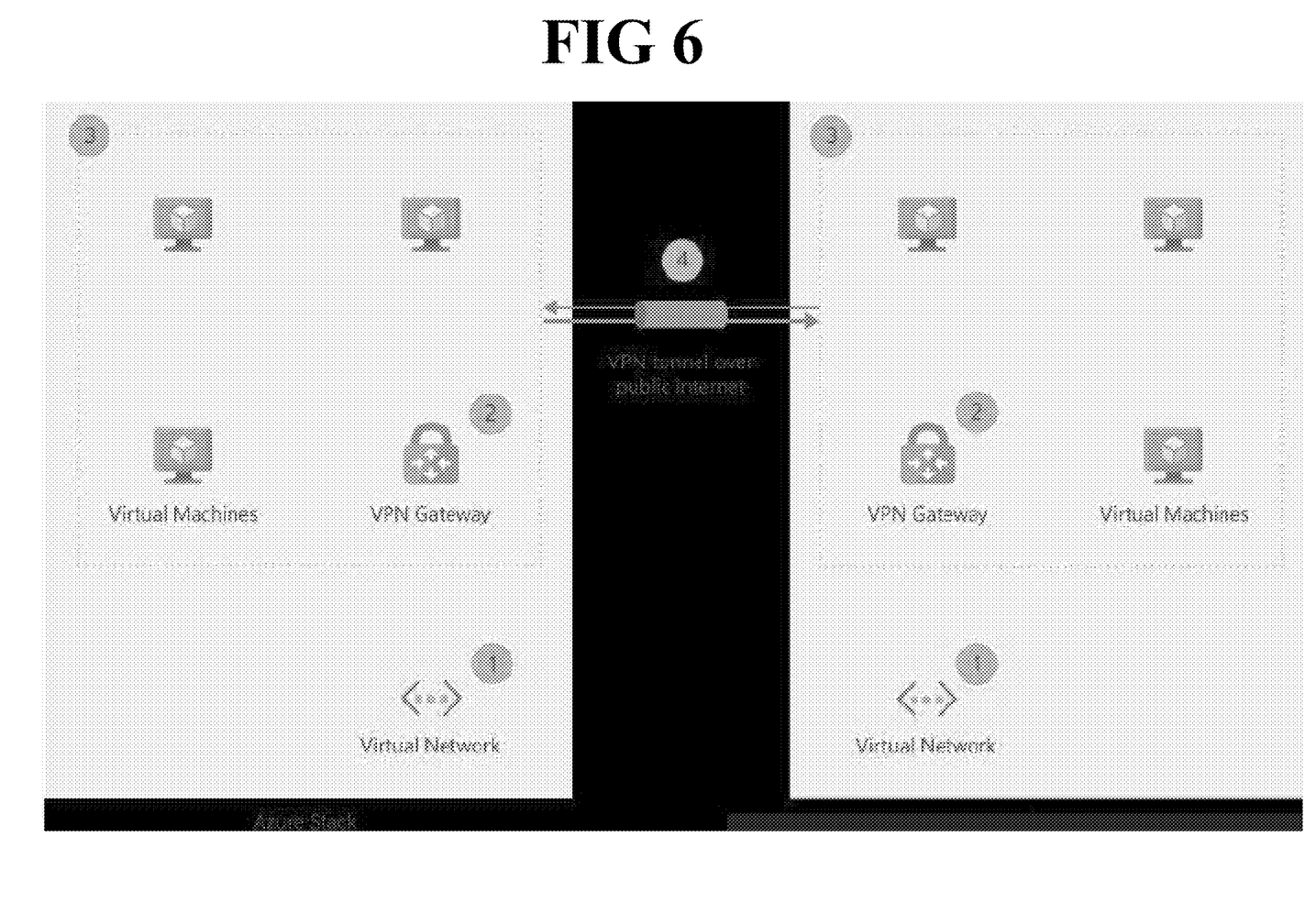
FIG. 6 depicts the hybrid connectivity used in various embodiments of the present invention.

In element 313, edge and disconnected scenarios are enabled using Azure edge technologies.

Figure 7:
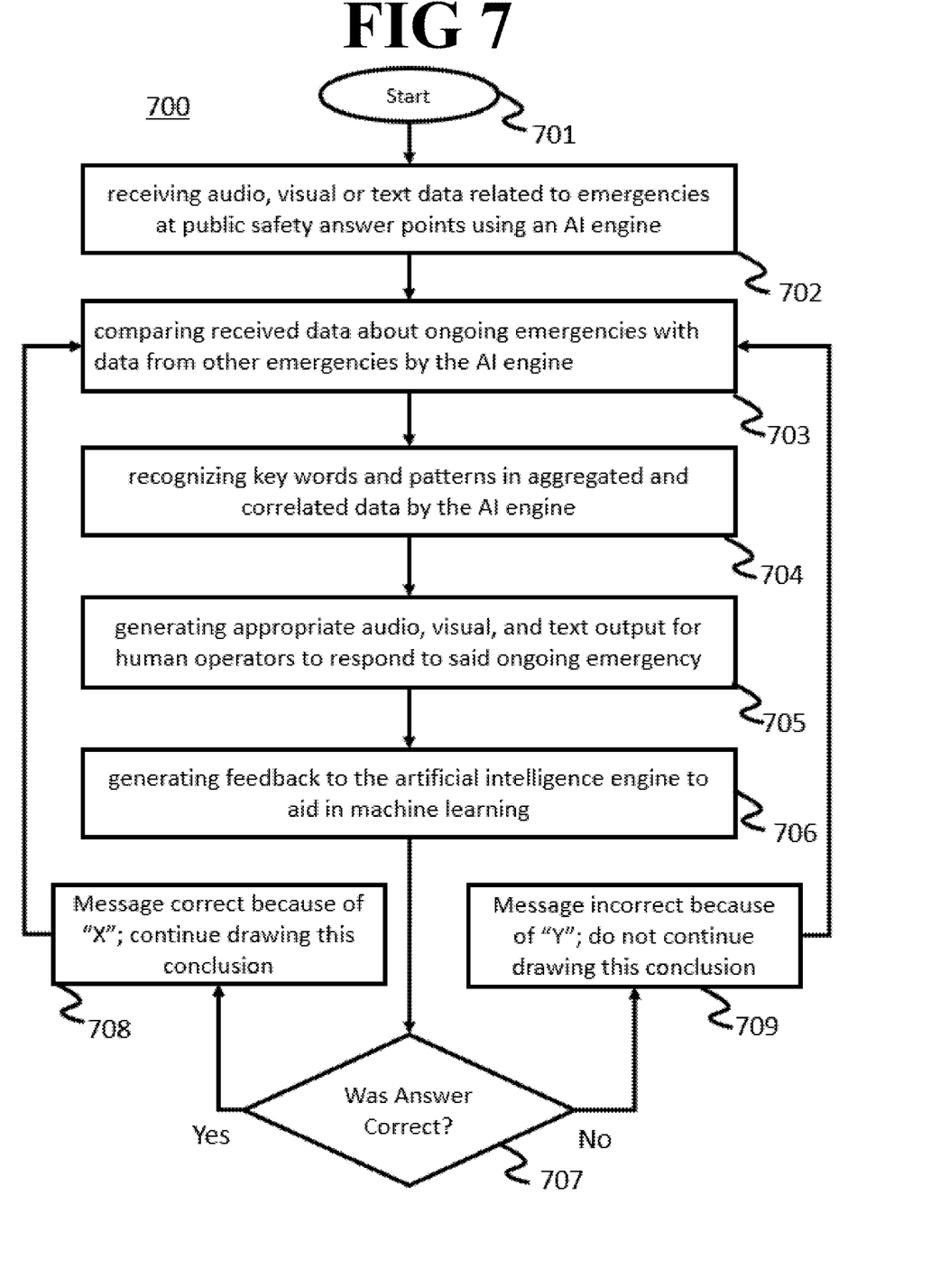
FIG. 7 depicts an exemplary embodiment of a method for managing and processing data from multiple PSAPs according to still another aspect of the present invention.

Turning to FIG. 7, shown therein is an exemplary embodiment 700 of a method for processing and managing data being received at multiple public safety answering points related to multiple ongoing emergencies. The process begins at step 701, and moves to step 702. In step 702, many different kinds of data are being received at the multiple public safety answering points, including but not limited to audio data, visual data, video data, text data or the like. All of these kinds of data are related to ongoing emergencies. All of this data is fed to the AI engine.

In step 703, the AI engine compares all of the data related to the ongoing emergencies with data from other emergencies stored in potentially multiple databases.

In step 704, the AI engine recognizes key words and patterns in the aggregated and correlated data stored in the databases.

In step 705, based on this recognition and the AI analysis, the AI engine generates appropriate audio, visual, and text output for a human operator to respond to each of the ongoing emergencies. Moreover, multiple human operators may be sent messages depending on the type of message, as discussed above.

In step 705, the recipients of these messages generate automated responses to the AI engine informing the AI engine of the suitability of the message the AI sent. For example, if the message was correct (step 707), the automated message will state "message correct because of "X" (where "X" is the reason) (step 708). And, for example, if the message was incorrect (step 707), the automated message will state "message incorrect because of "Y" (where "Y" is the reason) (step 709).

After step 708 or 709 the process returns to step 703 for continuing analysis.

By now, it will be appreciated that there is disclosed herein a system, method, apparatus, and computer program product for dynamically analyzing data in many forms as the data is being sent to a single PSAP or multiple PSAPs across a region or nation. The full power of the present invention results from reviewing large amounts of data being presented to many different PSAPs to uncover certain events as they are unfolding and as early as possible to limit the scope of the damage or devastation. The system, method, apparatus, and computer program product examines data as it arrives as compares the data to a database of data from other emergencies using an information handling system having a processor and a memory. As disclosed, the system, method, apparatus, and computer program product receive a plurality of data in many forms. In selected embodiments, the AI engine is improved through the use of feedback from human operators, which helps guide the AI engine towards better results. This feedback can be simply "the answer is correct, continue drawing this conclusion;" Or the opposite, "the answer is NOT correct, discontinue drawing this conclusion." Additional information may be provided, such as the reason why the answer is correct or incorrect, depending on the particular circumstance.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An apparatus for emergency assistance, comprising:
a communications link to one or more public safety answering points;
an artificial intelligence engine coupled via the communications link to the one or more public safety answering points, said artificial intelligence engine using word associations for machine learning;
said artificial intelligence engine receiving via the communications link audio data, visual data, and text data being sent simultaneously to one or more public safety answering points;
a database storing data from a plurality of other emergencies, wherein said artificial intelligence engine queries said database upon receiving an incoming data;
said artificial intelligence engine analyzing said incoming data and said data from said plurality of other emergencies by recognizing key words and patterns in aggregated and correlated data;
based on said analyzing, said artificial intelligence engine generating one or more of the following messages: an audio message, a visual message, and a text message;
said artificial intelligence engine sending said one or more messages to a human operator; and
said artificial intelligence engine receiving feedback from the human operator regarding said one or more messages;
wherein said feedback includes one or more of the following: (i) the message was correct because of X; continue drawing this conclusion; and (ii) the message was wrong because of Y;
do not continue drawing this conclusion.

2. The apparatus according to claim 1, wherein said communication link is also connected to one or more federal, state and local agencies in addition to the one or more public safety answering points, and said human operator may be in one of said one or more federal, state and local agencies.

3. The apparatus according to claim 1, wherein data is received by the artificial intelligence engine through voice recognition of audio from a telephone call to one of the one or more public safety answering points.

4. The apparatus according to claim 1, wherein data is received by the artificial intelligence engine through object recognition of visual data to one of the one or more public safety answering points.

5. The apparatus according to claim 1, wherein the database includes audio data of a plurality of telephone calls to one or more public safety answering points.

6. The apparatus according to claim 1, wherein said one or more messages include an audio, visual, or text prompt to a human operator to ask one or more questions.

7. The apparatus according to claim 1, wherein said one or more messages include a statistical confidence level associated with any data analysis.

8. The apparatus according to claim 1, wherein said one or more messages include one or more potential medical diagnoses.

9. The apparatus according to claim 1, wherein said one or more messages include a predicted cause of an emergency.

10. The apparatus according to claim 1, wherein said one or more messages include an audio, visual, or text report of related emergencies to a same public safety answering point or other public safety answering points.

11. The apparatus according to claim 1, wherein said one or more messages include geographic coordinates or a map.

12. The apparatus according to claim 1, wherein data received by the artificial intelligence engine is automatically added to the database for response to other emergencies.

13. The apparatus according to claim 1, wherein said one or more messages include a prompt to one or more emergency managers outside a public safety answering point that received the call.

14. A method for providing emergency assistance comprising:
receiving audio, visual, or text data about an ongoing emergency at a public safety answering point;
comparing said audio, visual, or text data about said ongoing emergency with a database of other emergencies using an artificial intelligence engine;
recognizing key words and patterns in aggregated and correlated data by the artificial intelligence engine;
generating appropriate audio, visual, and text output for a human operator to respond to said ongoing emergency; and
generating feedback to the artificial intelligence engine to aid in machine learning;
wherein said feedback includes one or more of the following: (i) the message was correct because of X; continue drawing this conclusion; and (ii) the message was wrong because of Y; do not continue drawing this conclusion.

15. The method according to claim 14, wherein said human operator is situated in one of a plurality of federal, state and local agencies distinct from said public safety answering point.

16. The method according to claim 14, further comprising receiving data by the artificial intelligence engine through voice recognition of audio from a telephone call to one of the one or more public safety answering points.

17. The method according to claim 14, further comprising receiving data by the artificial intelligence engine through object recognition of visual data to one of the one or more public safety answering points.

18. The method according to claim 14, further comprising storing in a database audio data of a plurality of telephone calls to one or more public safety answering points.

19. The method according to claim 14, further comprising sending an audio, visual, or text prompt to a human operator to ask one or more questions.

20. The method according to claim 14, further comprising sending a statistical confidence level associated with any data analysis.

21. The method according to claim 14, further comprising sending one or more potential medical diagnoses.

22. The method according to claim 14, further comprising sending a predicted cause of an emergency.

23. The method according to claim 14, further comprising sending said one or more an audio, visual, or text reports of related emergencies to a same public safety answering point or other public safety answering points.

24. The method according to claim 14, further comprising sending geographic coordinates or a map.

25. The method according to claim 14, further comprising adding data received by the artificial intelligence engine automatically to the database for response to other emergencies.

26. The method according to claim 14, further comprising sending a prompt to one or more emergency managers outside a public safety answering point that received the call.

27. A method for managing and processing data from a plurality of public safety answering points comprising:

receiving audio data, visual data, and text data related to a plurality of ongoing emergencies being received at a plurality of public safety answering points;

comparing said audio data, visual data, and text data about said plurality of ongoing emergencies with one or more databases storing relevant data from a plurality of other emergencies using an artificial intelligence engine;

identifying a plurality of key words and a plurality of patterns among the compared data by the artificial intelligence engine;

generating appropriate audio, visual, and text output for a plurality of human operators to respond to said plurality of ongoing emergencies; and generating continuously feedback to the artificial intelligence engine to aid in machine learning based on the generated output; and wherein said feedback includes one or more of the following: (i) "the message was correct; continue drawing this conclusion"; and (ii) "the message was wrong; do not continue drawing this conclusion."

* * * * *